(12) United States Patent
Yamabayashi et al.

(10) Patent No.: US 6,860,647 B2
(45) Date of Patent: Mar. 1, 2005

(54) OPTICAL TRANSMISSION MODULE

(75) Inventors: Naoyuki Yamabayashi, Osaka (JP); Yoshiki Kuhara, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 23 days.

(21) Appl. No.: 10/310,557

(22) Filed: Dec. 5, 2002

(65) Prior Publication Data
US 2003/0161590 A1 Aug. 28, 2003

(30) Foreign Application Priority Data
Dec. 13, 2001 (JP) ........................................ 2001-380547

(51) Int. Cl.[7] .............................................. G02B 6/30
(52) U.S. Cl. ........................................ 385/88; 385/89
(58) Field of Search ............................. 385/53, 59, 60, 385/88–94

(56) References Cited
U.S. PATENT DOCUMENTS

| | | | | |
|---|---|---|---|---|
| 6,325,553 | B1 | * 12/2001 | Deacon et al. | ................. 385/89 |
| 6,614,964 | B2 | * 9/2003 | Kuhara et al. | ................. 385/49 |
| 2002/0085816 | A1 | * 7/2002 | Nishimura | ................... 385/89 |
| 2003/0210873 | A1 | * 11/2003 | Moretti | ......................... 385/89 |

FOREIGN PATENT DOCUMENTS

| | | |
|---|---|---|
| JP | 11-237529 | 8/1999 |
| JP | 2000-200937 | 7/2000 |
| JP | 2001-305393 | 10/2001 |

* cited by examiner

*Primary Examiner*—Chau N. Nguyen
(74) *Attorney, Agent, or Firm*—Fish & Richardson P.C.

(57) ABSTRACT

An optical transmission module includes plural optical transmission means (optical waveguides) whose end portions are exposed on a first end face thereof, and at least one of an optical transmitting section and an optical receiving section to each of which some of the optical transmission means are optically coupled. The remaining optical transmission means are exposed on a second end face opposed to the first end face. Only some of the plural optical transmission means are designed to have a communication facility at some position in the longitudinal direction thereof, while the remaining optical transmission means are designed to have the communication facility by being connected to post-stage optical transmission modules in the longitudinal direction. By multistage-connecting these optical transmission modules, plural optical transmission means and optical transmission modules can be collectively connected at a narrow frontage.

14 Claims, 9 Drawing Sheets

PRIOR ART

FIG. 15 PRIOR ART

OPTICAL TRANSMISSION MODULE

BACKGROUND OF THE INVENTION

1. Field of the Invention

The present invention relates to an optical transmission module. Particularly, the present invention relates to optical transmission module that can be reduced in size and weight and to which a multicore optical fiber ribbon or the like can be connected.

2. Description of the Related Art

Prior Art 1

Figure 13:
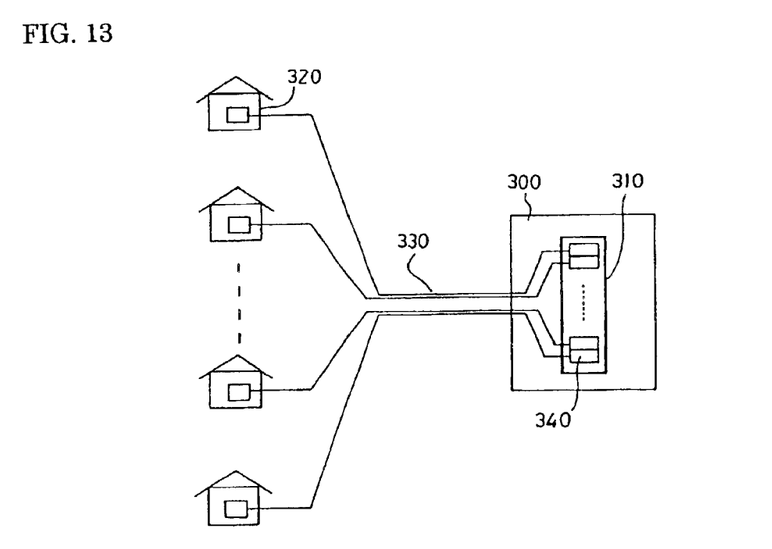
FIG. 13 is a schematic diagram illustrating an optical fiber network from a central station to subscribers.

When bi-directional communication is to be performed with a plurality of optical fibers, a system shown in FIG. 13 is constructed. This system is an optical fiber network in which optical fibers 330 are led into subscribers 320 from an optical communication equipment 310 provided in a central station 300. The optical communication equipment 310 is constituted of an assembly of a multitude of optical transmission modules 340.

Figure 14:
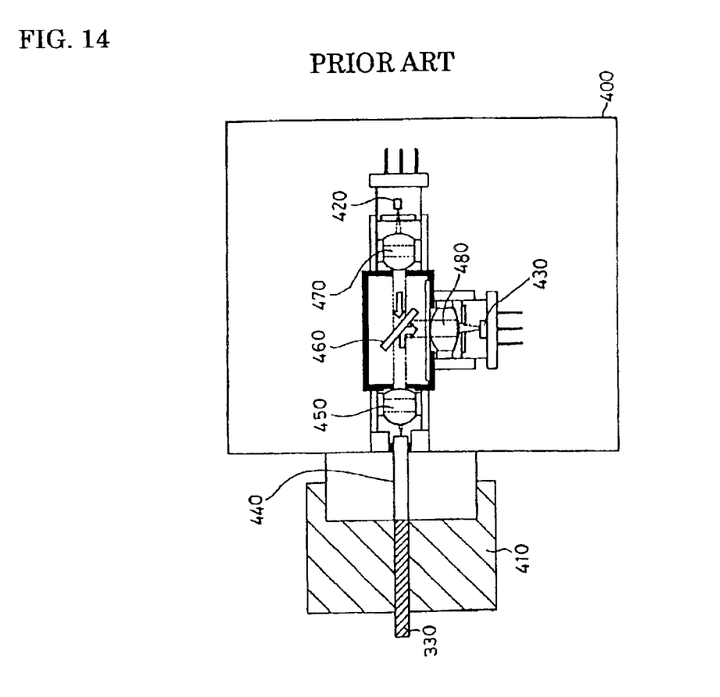
FIG. 14 is a representation explaining a conventional structure of the optical coupling between an optical fiber and an optical transmission module.

One example of this optical transmission module is illustrated in FIG. 14. In this module 400, a light emitting device 420 or a light receiving device 430 is optically coupled to each core of the multicore optical fiber 330 via an FC type or SC type connector 410. More specifically, an optical fiber 440 connected to the connector 410, a lens 450, a mirror 460, a lens 470, and a light emitting device 420 such as a laser diode (LD) are coaxially arranged. On the other hand, a light receiving device 430 such as a photodiode (PD) is provided along the direction perpendicular to the axial direction of the optical fiber via a lens 480.

Figure 15:
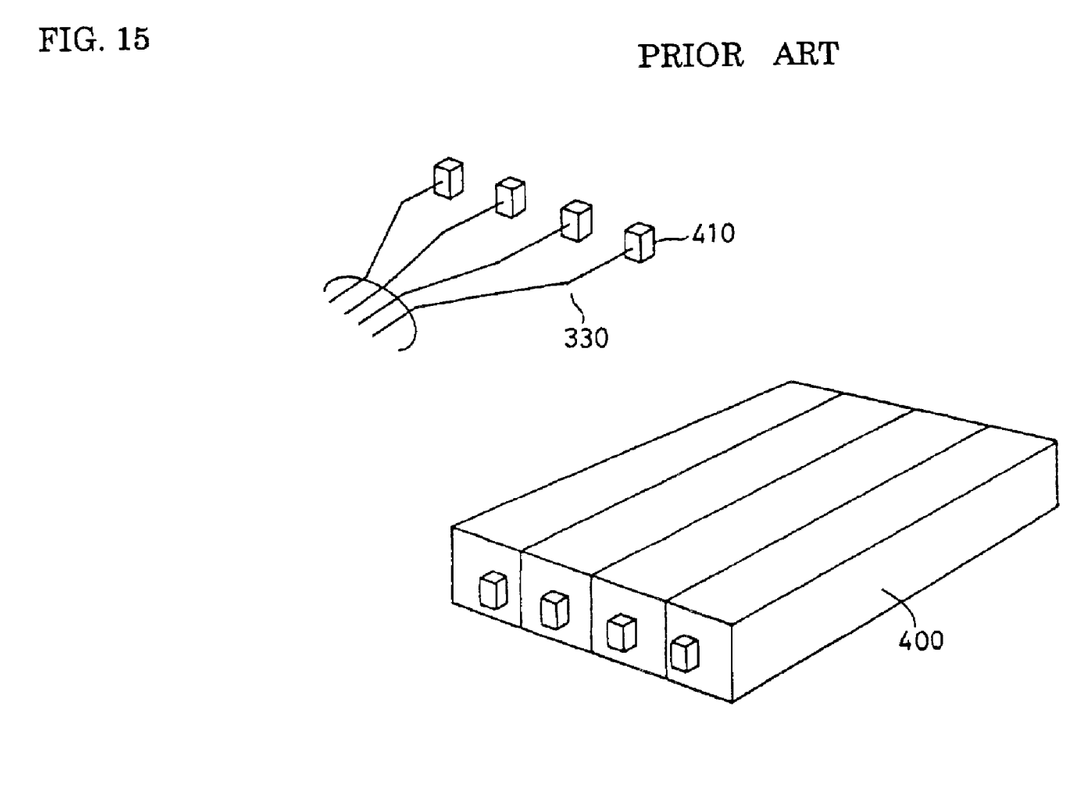
FIG. 15 illustrates a conventional structure of the optical coupling between a multicore optical fiber ribbon and optical transmission modules.

The multicore optical fiber ribbons 330 are led in up to the immediate forefront of this optical transmission module, and as shown in FIG. 15, the individual cores of the multicore optical fiber ribbons 330 are, after being separated, connected via connectors 410 to respective optical transmission modules arranged in parallel in the horizontal direction.

Prior Art 2

On the other hand, Japanese Unexamined Patent Application Publication No. 2000-200937 discloses a transmitter designated as a "parallel link" for optical parallel transmission. This is an optical parallel transmitter for optically coupling a plurality of light emitting devices and a plurality of optical fibers by positioning them with guide pins.

Prior Art 3

Also, Japanese Unexamined Patent Application Publication No. 11-237529 discloses an optical transmission/reception module that has transmission/reception functions by using a single optical fiber. This is an optical transceiver including a single light waveguide, a light emitting device, and a light receiving device. The waveguide and an external optical fiber are positioned with the guide pins, and are optically coupled.

However, the above-described prior arts raise a problem in that there is no appropriate compact means for collectively connecting multicore cores optical fibers to optical transmission modules.

In the optical transmission module according to the prior art 1, a multicore optical fiber ribbon cannot be connected to optical transmission modules unless it is branched out for every core. Therefore, the connector of each of the optical transmission modules must be arranged in parallel with some distance interposed between it and an adjacent connector. On the other hand, because the optical transmission module has an optical system in which the optical axis of the optical emitting device and that of the optical receiving device are orthogonal to each other, the manufacturing thereof is difficult, and the optical transmission module itself has a large size. Even if the parallel distance between the connectors is reduced, a large size of each of the optical transmission modules constitutes a large limiting factor on the miniaturization of this optical transmission module device.

In the prior art 2, a transmitter is the only one component that can be accommodated, and electronic components such as a driver Integrated Circuit (IC) of an LD cannot be mounted. This is because there is no space to mount a light emitting device since the parallel pitch of the optical fibers is as narrow as 250 μm.

The prior art 3 is a technique concerning a single optical fiber, and hence the technique is not capable of optically coupling multicores of optical fibers collectively to optical transmission modules.

SUMMARY OF THE INVENTION

Accordingly, it is an object of the present invention to provide an optical transmission module reduced in size and weight.

It is another object of the present invention to provide an optical transmission module capable of collectively connecting multicores of optical fibers without branching them out.

It is still another object of the present invention to provide an optical transmission module capable of providing both of a transmitting function and a receiving function even to a plurality of optical transmission means arranged at a narrow parallel pitch.

The present invention can achieve the above-described objects by shifting, in the axial direction of an optical transmission means, the connection points where a light emitting device or light receiving device is connected to each of plural optical transmission means by using a plurality of optical transmission modules.

Specifically, the optical transmission module according to the present invention includes a first end face; a plurality of optical transmission means of which end portions are exposed on the first end face; at least one of an optical transmitting section and an optical receiving section to each of which some of the optical transmission means are optically coupled; and a second end face which is opposed to the first end face, and on which the end faces of the remainder of the optical transmission means are exposed.

In the past, attempts have been made to provide a plurality of optical transmission means with a communication facility by connecting a light emitting device and a light receiving device to each of the plural optical transmission means at the same position in the longitudinal direction thereof. This has imposed a large restriction in terms of space. The present inventors have conceived a novel idea such that only some (either one or more) of the plurality of optical transmission means are provided with an optical communication facility at a position in the longitudinal direction thereof, while the remaining optical transmission means are provided with an optical communication facility by connecting them to post-stage optical transmission modules in the longitudinal direction. With these arrangements, a plurality of optical transmission means, such as multicore optical fiber ribbons, and optical transmission modules can be connected at a narrow frontage. In particular, it is possible to form optical transmission modules suitable for collectively connecting cores of a multicore optical fiber ribbons. Also, since a plurality of optical transmission means and optical transmission modules can be connected at a space with a narrow frontage, the storage number of devices in a central station can be increased.

The above-described optical transmission module may include electrical connection media exposed on the first end face and connected to at least one of the optical transmitting section and the optical receiving section, and guide terminals provided on the second end face and connected to the respective electrical connection media of a next-stage optical transmission module.

As shown in FIG. 8 in Japanese Unexamined Patent Application Publication No. 2001-305393, a conventional surface-amount optical transmission module has a construction in which many leads connected to a light emitting device and a light receiving device are projected in the direction perpendicular to the longitudinal direction of optical transmission means, i.e., through the side surface of the module. In contrast, the optical transmission module according to the present invention can eliminate leads projecting sideward by leading out electrical connection media such as lead pins through the end face of the module as opposed to through the side surface. Also, it is possible to easily connect modules in a multistage manner by exposing the electrical connection media on the end face of the module, and to implement a high density mounting by establishing the connection between the module and a circuit board at a narrow frontage.

The optical transmission means exposed on the second end face may be caused to make a detour to avoid overlapping with at least one of the optical transmitting section and the optical receiving section. When the optical transmitting section and/or the optical receiving section is optically coupled to an optical transmission means, if the parallel pitch of the optical transmission means is reduced, the path of an optical transmission means adjacent to this optical transmission means might be blocked by the optical transmitting section and the optical receiving section. Therefore, the optical transmission means that are not optically coupled to the optical transmitting section or the optical receiving section need not to have a wide parallel pitch of the optical transmission means if their paths are formed detouring around the optical transmitting section and/or the optical receiving section. This enables the implementation of the miniaturization of the optical transmission module. The detour of the optical transmission means can be achieved by forming optical waveguides into curved shapes or disposing optical fibers in curved states.

The optical transmission module according to the present invention may further includes guide pins provided on the first end face, and guide holes which are provided on the second end face and into which the respective guide pins of a next-stage optical transmission module are inserted. Forming such guide pins and guide holes facilitates positioning the optical transmission modules with high accuracy and connecting them in a multistage manner.

The guide pins may be formed so as to fit into a Mechanically Transferable Splicing Connector (MT connector) formed at an end portion of the multicore optical fiber ribbon. Thereby, the multicore optical fiber ribbon can be connected to the optical transmission modules with high accuracy.

The optical transmission modules each having guide pins and guide holes thus formed may be connected in a multistage manner. This allows optical transmission through a plurality of channels at a narrow frontage.

Optical waveguides or optical fibers may be used as the optical transmission means.

A semiconductor laser or a light emitting diode (LED) may be used for the optical transmitting section. The optical transmitting section may have a driving device for the semiconductor laser.

A semiconductor light receiving device may be used for the optical receiving section. A PD and an avalanche photodiode (APD) are examples of the semiconductor light receiving device. The optical receiving section may have an amplifying unit for amplifying electrical signals of the semiconductor light receiving device.

As described above, according to the optical transmission module of the present invention, only some of the plurality of optical transmission means are designed to have an optical communication facility at a position in the longitudinal direction thereof, and the remaining optical transmission means are designed to have an optical communication facility by being connected to post-stage optical transmission modules in the longitudinal direction. By virtue of such structure, it is possible to connect a plurality of optical transmission means, such as a multicore optical fiber ribbons, and optical transmission modules at a narrow frontage.

In particular, it is possible to constitute optical transmission modules such that a multicore optical fiber ribbon can be connected thereto without separating the multicore optical fiber ribbon into each individual core.

Since the connection between the optical transmission means and the optical transmission modules can be achieved at a space with a narrow frontage, the storage number of devices in a central station can be easily increased.

The above and other objects, features, and advantages of the present invention will become clear from the following detailed description of the preferred embodiments of the invention in conjunction with the accompanying drawings.

DETAILED DESCRIPTION OF THE INVENTION

Hereinafter, the embodiments according to the present invention will be described with reference to the accompanying drawings. The same reference numerals are used to denote the same components or parts throughout all drawings, and repeated descriptions thereof are omitted.

First Embodiment

Here, the present invention will be described taking, as an example, an optical transmission module connected to a 4-core optical fiber ribbon in which an MT connector is formed at an end portion thereof.

Figure 1:
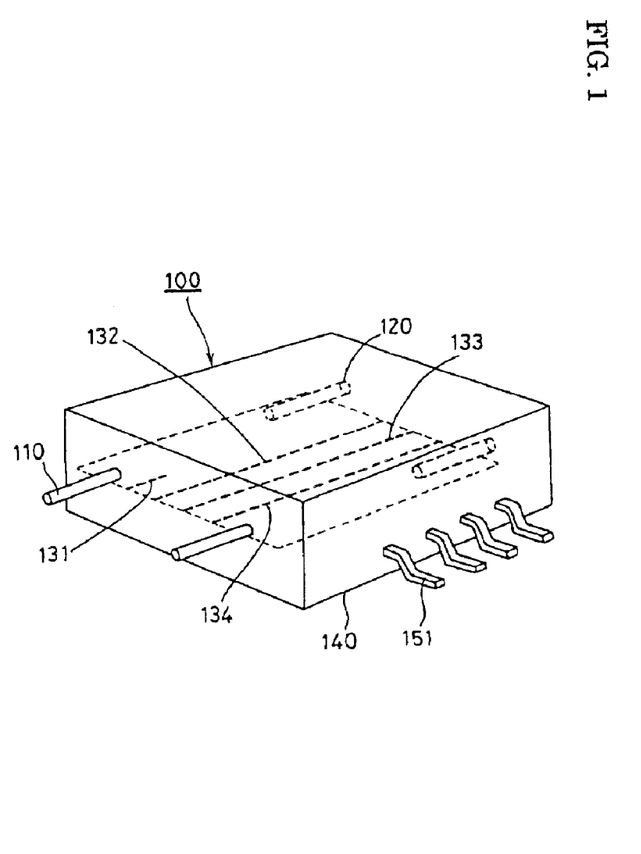
FIG. 1 is a perspective view of an optical transmission module according to the present invention.

As shown in FIG. 1, in this module 100, one end face thereof has a pair of guide pins 110 projected therethrough, and the other end face thereof has guide holes 120 into which the guide pins of a post-stage module are to be inserted. The end faces of four light waveguides 131 to 134 are exposed between the guide pins 110 on the one end face, while the end faces of three light waveguides 132 to 134 are exposed between the guide holes 120 in the other end face. The entire module 100 is covered with resin mold 140 formed into a rectangular parallelepiped shape, and a plurality of leads 151 are projected through opposite side surfaces. This module 100 is a first-stage module. At stages succeeding to the first stage, modules are sequentially connected in a multistage manner, as described later.

Figure 2:
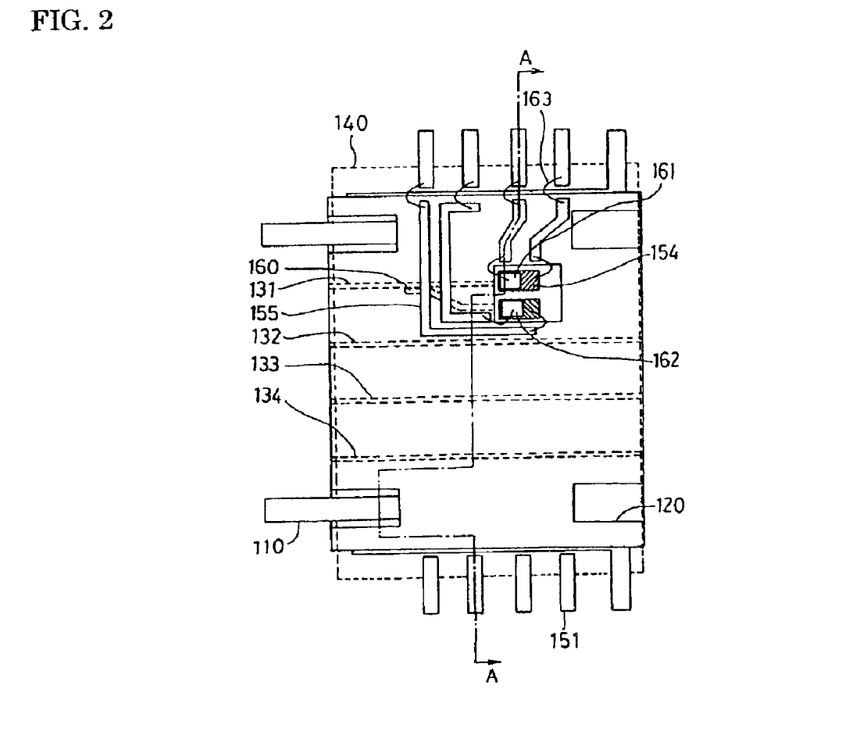
FIG. 2 is a perspective plan view showing the inner structure of an optical transmission module of the first stage according to the present invention.

FIG. 2 shows the inner structure of the module 100. An optical communication facility section is connected only to one of the four light waveguides 131 to 134. Specifically, this one light waveguide 131 is branched out on the way, via an optical multiplexer/demultiplexer 160. A light emitting device 161 is optically coupled to one branched end, and a light receiving device 162 is optically coupled to the other branched end. Here, an InGaAsP-based LD, which transmits light with a wavelength of 1.3 μm, is used as the light emitting device 161, and an InGaAs-based PD, which receives light with a wavelength of 1.5 μm, is used as the light receiving device 162. The remaining three light waveguides 132 to 134 are each arranged so that the paths thereof are linearly formed from one end face to the other end face, as they are.

Figure 3:
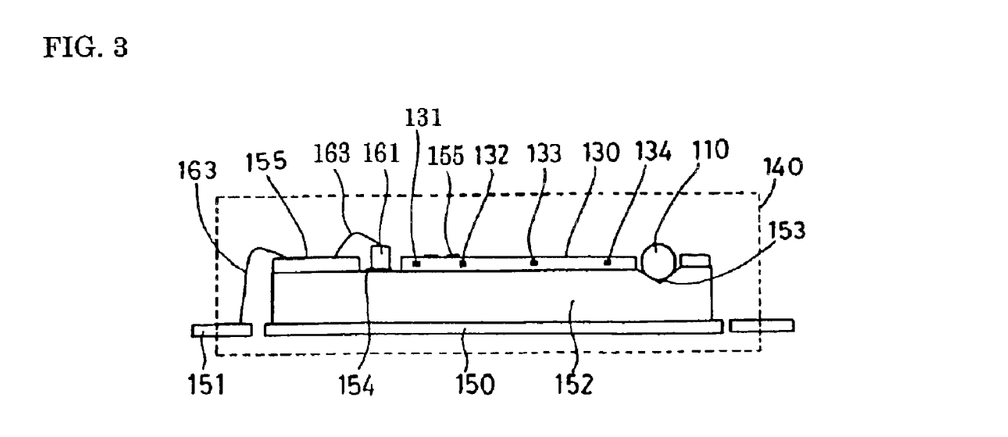
FIG. 3 is a sectional view taken along the line A—A in FIG. 2.

As shown in FIG. 3, in the above-described optical communication facility section, a Si platform 152 is formed on the base metal 150 of a lead frame, and a clad layer 130 constituted of $SiO_2$ is formed thereover. The light waveguides 131 to 134 constituted of $SiO_2/GeO_2$ are formed within the clad layer 130. At the places where the guide pins 110 are to be disposed, a V-groove 153 is formed on the Si platform 152. Also, at the places where the light emitting device 161 and the light receiving device 162 are to be disposed, metallized patterns 154 are formed on the Si platform 152, and the devices 161 and 162 are mounted on the patterns 154. These devices 161 and 162 are connected to the leads 151 through Au lines 163 and metallized patterns 155 formed on the clad layer 130. The Au line 163 can be connected with a wire bonding machine. In FIGS. 2 and 3, the portions boxed in a broken line drawn intersecting the leads 151 represents the outlines of the resin mold 140. The resin mold is constituted of, e.g., an epoxy resin.

All light waveguides 131 to 134 are not, in this manner, designed to have an optical communication facility in the one module 100, but only the light waveguide 131, which is one portion of the light wave guides 131 to 134, is provided with the optical communication facility, and the remaining light waveguides 132 to 134 are passed through the module at this stage, and are led to a next-stage light waveguide. This enables the size of an optical transmission module per unit stage to be significantly reduced.

Figure 4:
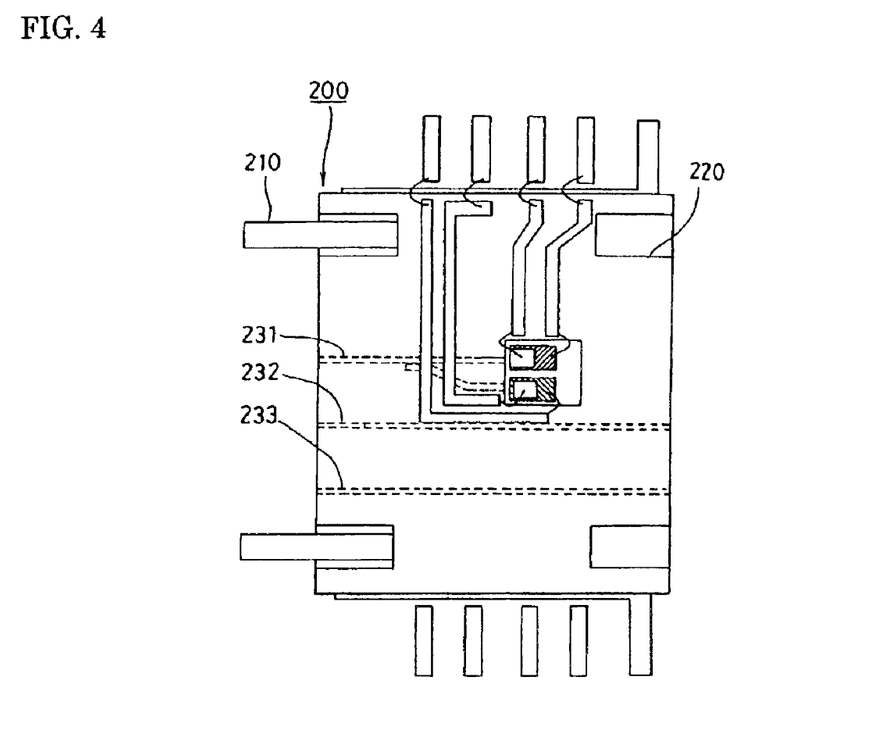
FIG. 4 is a perspective plan view showing the inner structure of an optical transmission module of the second stage according to the present invention.

This module 100 is connected to a second-stage optical transmission module 200 shown in FIG. 4. The second-stage module 200 also has a construction in which guide pins 210 and guide holes 220 are provided on one and the other end faces thereof, respectively, and in which leads are projected through opposite side surfaces. However, the end faces of three light waveguides 231 to 233 are exposed on one end face of the module 200, while the end faces of two light waveguides 232 to 233 are exposed on the other end face thereof. A PD and an LD are connected only to the light waveguides 231 of three light waveguides, as in the case of the first-stage module 100.

The second-stage optical transmission module 200 is connected by inserting the guide pins 210 thereof into the respective first-stage guide holes 120. By the engagement between the guide pins 210 and the respective guide holes 120, the light waveguides 132 to 134 and the light waveguides 231 to 233 in the two stages are aligned with high accuracy, and are connected. The distance between guide pins 110 and that between the guide pins 210 are each set to be 3.6 mm.

Similarly, in a third-stage module, the communication facility is provided only to one of the two light waveguides. A fourth-stage module has only one waveguide, and a communication facility is provided to this waveguide.

Figure 5:
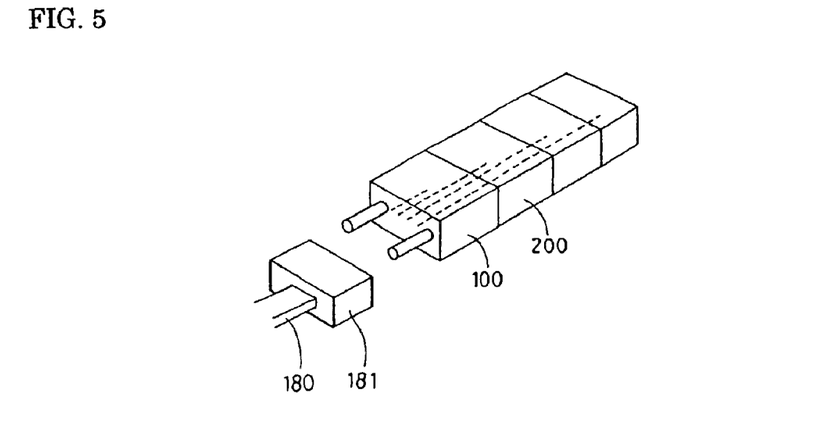
FIG. 5 is a schematic perspective view showing four-stage connected optical transmission modules according to the present invention.

Such modules are connected in a manner such that the second stage module is connected to the first stage module, and further, the third stage and the fourth stage are sequentially connected similarly in a multistage manner, and such that the optical communication facilities are disposed in an arrangement shifted in the longitudinal direction of the light waveguides. As shown in FIG. 5, the first-stage optical transmission module can be directly connected to an MT connector 181 formed at an end portion of a 4-core optical fiber ribbon 180. Specifically, the arrangement is such that the optical fiber pitch of the MT connector 181 and the parallel pitch of the light waveguides are aligned, and the guide pins 110 are fitted into the MT connector 181. Thereby, the multicore optical fiber ribbon can be connected to the optical transmission modules 100 without separating its individual cores. The outer dimensions of the MT connector used here are 6 mm in width, 8 to 10 mm in length, and 1 mm in height.

Figure 6:
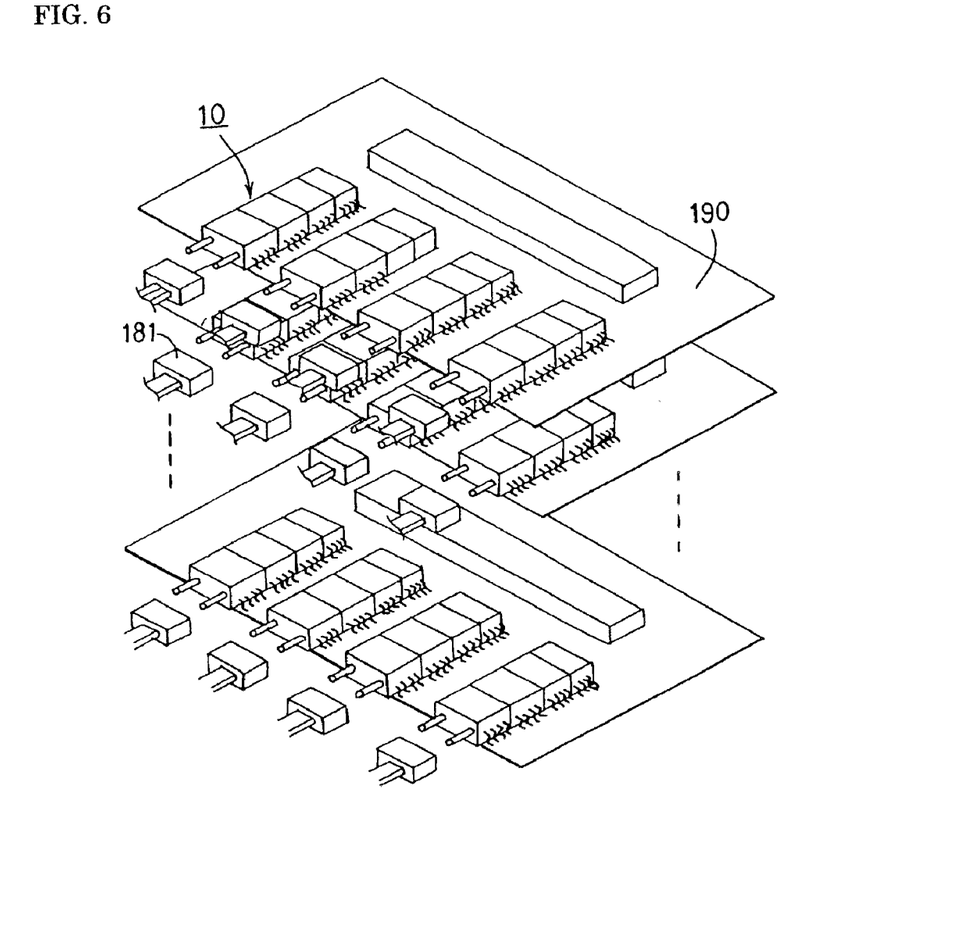
FIG. 6 is a schematic construction view illustrating optical communication equipment formed by stacking many modules shown in FIG. 5.

As shown in FIG. 6, many module groups 10 each formed of multistage-connected modules of the present invention are mounted on a substrate 190, and by stacking a plurality of the substrates 190, an optical communication equipment having many optical transmission modules can be constructed. Here, the electrical interconnection of the modules 10 can be established through the metallized patterns on the substrate.

The above-described module preferably can be utilized when the pitch of the 4-core fiber ribbon is about 500 µm to 1 mm.

Second Embodiment

Next, a description will be made of a module according to the present invention that is usable even when the pitch of the cores of the 4-core fiber ribbon to be collectively connected is narrow. In this module, the parallel pitch of the light waveguides is set to be 250 µm in alignment with the pitch of the optical fiber.

Figure 7:
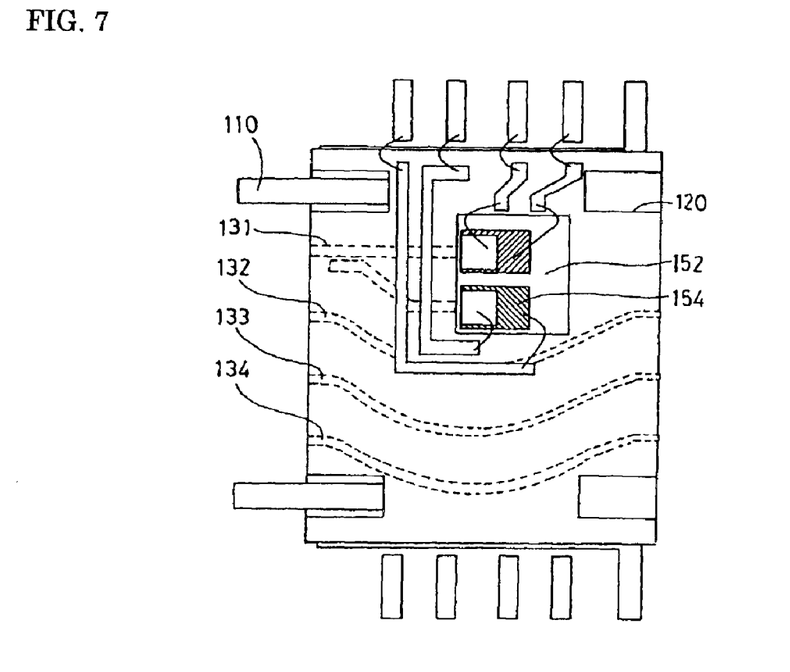
FIG. 7 is a perspective plan view showing an optical transmission module of the present invention in which waveguides are bent.

FIG. 7 is a perspective plan view showing the first-stage optical transmission module. Here, the Si platform 152 is depicted in an enlarged form.

In this module also, only one light waveguide 131 of the four cores (four waveguides) is formed into a linear shape, and is connected to the optical communication facility section, as in the case of the first embodiment. The remaining light waveguides 132 to 134 are formed into an arcuate shape so as to detour around the optical communication facility section.

As is evident from FIG. 3 showing the first embodiment, the optical communication facility section is constructed such that the metallized pattern 154 are formed on the Si platform 152 exposed by cutting out a portion of the clad layer 130, and an LD and a PD are mounted on the pattern 154. The widths of the LD and the PD are typically 250 to 350 µm, and therefore, if the light waveguides 132 to 134 are formed so as to detour around the optical communication facility section, the light waveguides 132 to 134 which are not connected to the optical communication facility section can be led out smoothly to the second end face side. At this time, it is unnecessary to widen the parallel pitch of the light waveguides 132 to 134, thereby implementing the miniaturization of the optical transmission module.

Third Embodiment

Figure 8:
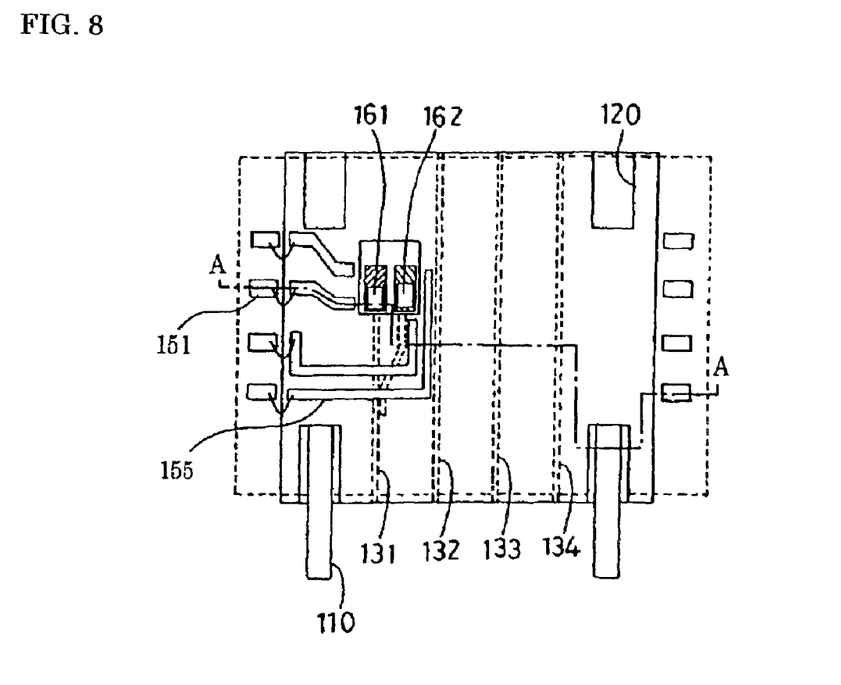
FIG. 8 is a perspective plan view showing an optical transmission module of the present invention in which lead pins are also exposed on an end face of the module.
Figure 9:
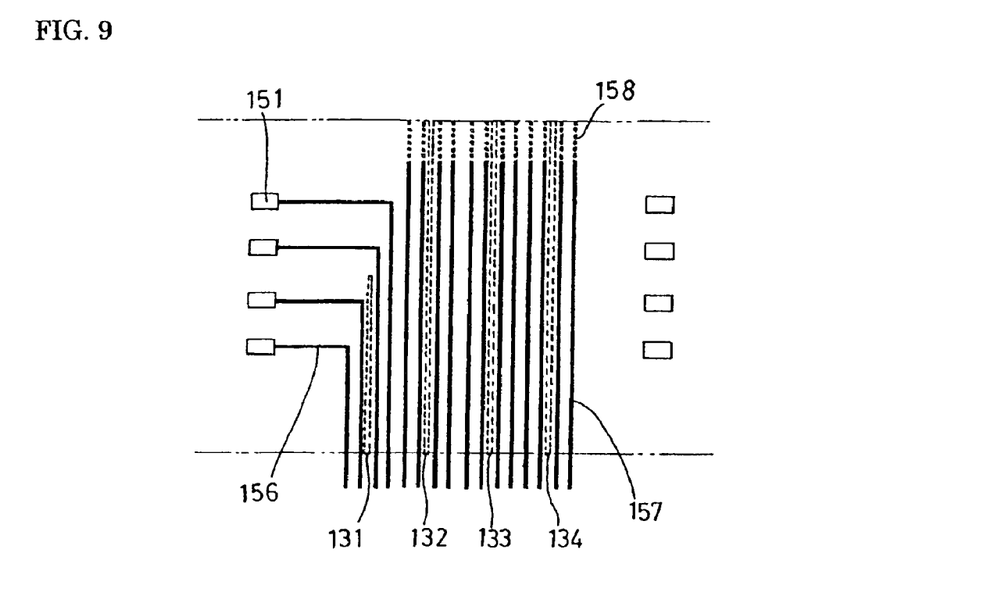
FIG. 9 is a plan view showing the arrangement of the lead pins of an optical transmission module of the present invention in which the lead pins are led out to an end face of the module.
Figure 10:
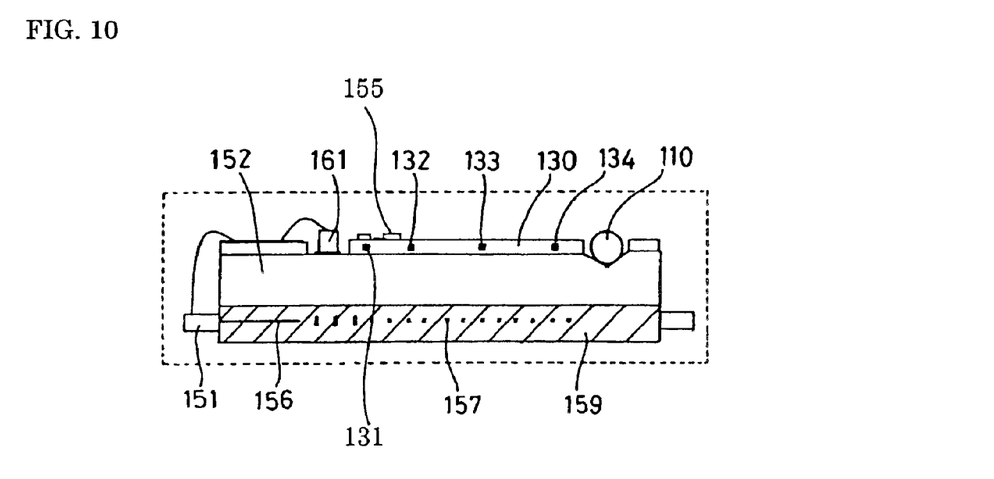
FIG. 10 is a longitudinal sectional view showing the arrangement of the lead pins of the optical transmission module of the present invention in which the lead pins are led out to the end face of the module.

Next, an optical transmission module of the present invention in which lead pins are also exposed on an end face of the module is shown in FIG. 8. FIG. 8 is a perspective plan view showing the optical transmission module of the present invention in which lead pins are also exposed on an end face of the module. FIG. 9 is a plan view showing the arrangement of the lead pins of an optical transmission module of the present invention in which the lead pins are led out to the end face of the module. FIG. 10 is a longitudinal sectional view illustrating the module shown in FIG. 8.

This module has a construction in which lead pins 156 are connected to the leads 151 that are connected to the optical communication facility section through the Au lines, and in which the lead pins 156 are led out, being curved on the way, to the first end face side of the module. The other lead pins 157, which are not connected to the optical communication facility section, are each arranged linearly such that one end thereof is projected through the first end face, the other end thereof is extending up to the second end face. The lead pins 157 are provided with guide grooves 158 on the second end face side thereof, in which the lead pins projected through the first end face of the next-stage module are fit. As shown in FIG. 10, all lead pins 156 and 157 are formed by being resin molded in advance with an epoxy resin 159 or the like, and are integrated with the bottom surface of the Si platform 152.

Figure 11:
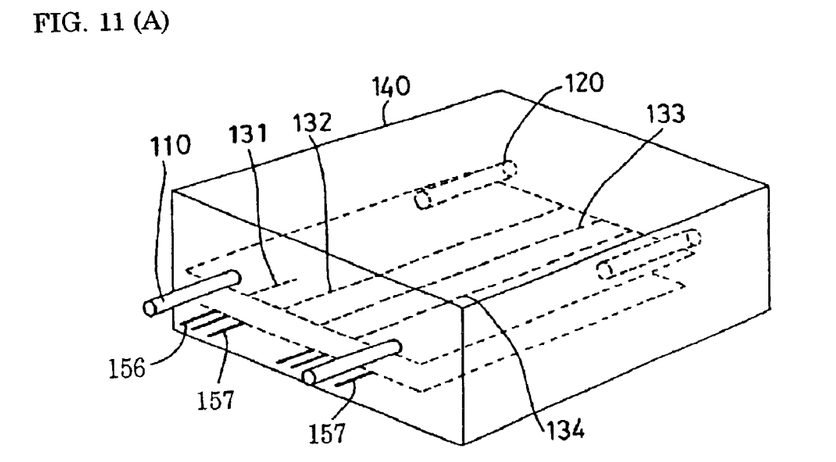
FIG. 11(A) and FIG. 11(B) are perspective views showing the optical transmission module of the present invention in which the lead pins are arranged in one stage and two stages, respectively.

As shown in FIG. 11(A), this module also is substantially resin molded. Guide pins 110 are projected through the first end face, and guide holes 120 into which guide pins of a next-stage module are to be inserted, are formed in the second end face. If there are many lead pins 156 and 157 to be led out to the end face, these lead pins may be arranged in a multistage manner, as shown in FIG. 11(B). Here, the lead pins are arranged on the top and bottom surfaces of the optical waveguide in a two-stage manner.

In the second-stage module, only one of the three light waveguides is provided with an optical communication facility section, as in the case of the first embodiment, and lead pins that are led out from the leads connected to the optical communication facility section are projected through the first end face. On the other hand, the lead pins that are not connected to the optical communication facility are passed through the second-stage module, and led to a third-stage module side.

During usage, by connecting the second-stage module to the first-stage module, and further sequentially connecting modules of the third and fourth stages in a multistage manner, electronic connection can also be established at a narrow frontage. Particularly, it is unnecessary to project the leads toward the side of the module, and hence further miniaturization of the module can be achieved.

Figure 12:
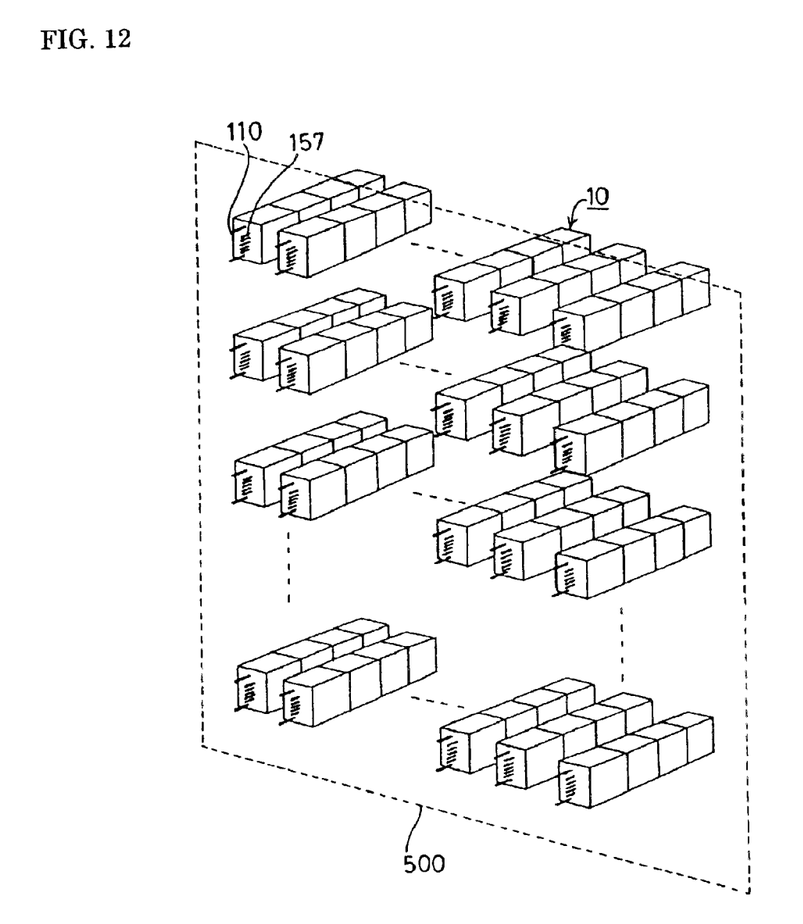
FIG. 12 is a schematic construction view showing a state in which groups of the modules shown in FIG. 8 each connected in four stages are connected to a substrate.

As shown in FIG. 12, out of module groups 10 that are connected in a multistage manner, the first modules 100 each located at the front end are connected to the substrate 500 in a manner such as to so as to thrust thereinto, thereby allowing many modules to be mounted with high density. On the substrate side where the first module is to be connected, guide grooves into which the guide pins are to be fitted are formed as in the case of the MT connector, and furthermore, guide grooves into which the lead pins are to be fitted are formed.

While the present invention has been described with reference to what are at present considered to be the preferred embodiments, it is to be understood that various changes and modifications may be made thereto without departing from the present invention in its broader aspects and therefore, it is intended that the appended claims cover all such changes and modifications that fall within the true spirit and scope of the invention.

What is claimed is:

1. An optical transmission module comprising:
   a first end face;
   a plurality of optical transmission means of which first end portions are exposed on said first end face;
   at least one of an optical transmitting section and an optical receiving section to which some of said optical transmission means are optically coupled;
   a second end face at an end of the module opposite from said first end face, wherein second end portions of those optical transmission means that are coupled neither to the optical transmitting section nor the optical receiving section are exposed on said second end face;
   electrical connection media exposed on the first end face, and connected to at least one of the optical transmitting section and the optical receiving section; and
   guide terminals provided on the second end face, and connected to the respective electrical connection media of a next-stage optical transmission module.

2. An optical transmission module according to claim 1, wherein the optical transmission means exposed on said second end face are arranged to make a detour to avoid overlapping with at least one of the optical transmitting section and the optical receiving section.

3. An optical transmission module according to claim 1, further comprising:
   guide pins provided on the first end face; and
   guide holes which are provided on the second end face, and into which respective guide pins of a next-stage optical transmission module are inserted.

4. An optical transmission module according to claim 3, wherein said guide pins are formed so as to fit into an MT connector formed at an end portion of a multicore optical fiber ribbon.

5. An optical transmission module according to claim 1, said optical transmission module comprising an electrical connection media exposed on the first end face and connected to at least one of the optical transmitting section and the optical receiving section, and further comprising guide terminals provided on the second end face and connected to the respective electrical connection media of a next-stage optical transmission module, wherein said optical transmission modules are connected in a multistage manner.

6. An optical transmission module according to claim 1, wherein said optical transmission module is formed by multistage-connecting optical transmission modules in each of which the optical transmission means exposed on said second end face are caused to make a detour to avoid overlapping with at least one of the optical transmitting section and the optical receiving section.

7. An optical transmission module according to claim 1, wherein said optical transmission means are each an optical waveguide.

8. An optical transmission module according to claim 1, wherein said optical transmission means are each an optical fiber.

9. An optical transmission module according to claim 1, wherein said optical transmitting section comprises a semiconductor laser.

10. An optical transmission module according to claim 9, wherein said optical transmitting section further comprises a driving device for the semiconductor laser.

11. An optical transmission module according to claim 1, wherein said optical receiving section comprises a semiconductor light receiving device.

12. An optical transmission module according to claim 11, wherein said optical receiving section further comprises an amplifying unit for amplifying electrical signals of the semiconductor light receiving device.

13. An optical transmission module comprising:

a first end face;

a plurality of optical transmission means of which first end portions are exposed on said first end face;

at least one of an optical transmitting section and an optical receiving section to which some of said optical transmission means are optically coupled; and a second end face at an end of the module opposite from said first end face, wherein second end portions of those optical transmission means that are coupled neither to the optical transmitting section nor the optical receiving section are exposed on said second end face;

wherein the optical transmission means exposed on said second end face are arranged to make a detour to avoid overlapping with at least one of the optical transmitting section and the optical receiving section.

14. An optical transmission module comprising:

a first end face;

a plurality of optical transmission means of which first end portions are exposed on said first end face;

at least one of an optical transmitting section and an optical receiving section to which some of said optical transmission means are optically coupled; and a second end face at an end of the module opposite from said first end face, wherein second end portions of those optical transmission means that are coupled neither to the optical transmitting section nor the optical receiving section are exposed on said second end face;

wherein said optical transmission module comprises an electrical connection media exposed on the first end face and connected to at least one of the optical transmitting section and the optical receiving section, and further comprising guide terminals provided on the second end face and connected to the respective electrical connection media of a next-stage optical transmission module, wherein said optical transmission modules are connected in a multistage manner.

* * * * *